(12) United States Patent
Colombo et al.

(10) Patent No.: US 11,659,099 B2
(45) Date of Patent: May 23, 2023

(54) REVERSE POWER FEED (RPF) POWER SUPPLY UNIT (PSU) AND ASSOCIATED METHOD OF USE

(71) Applicant: Microchip Technology Inc., Chandler, AZ (US)

(72) Inventors: Renato Colombo, Cologno Monzese (IT); Cesare Bocchiola, Settimo Milanese (IT)

(73) Assignee: Microchip Technology Inc., Chandler, AZ (US)

( * ) Notice: Subject to any disclaimer, the term of this patent is extended or adjusted under 35 U.S.C. 154(b) by 642 days.

(21) Appl. No.: 16/446,498

(22) Filed: Jun. 19, 2019

(65) Prior Publication Data

US 2020/0348738 A1 Nov. 5, 2020

Related U.S. Application Data

(60) Provisional application No. 62/841,503, filed on May 1, 2019.

(51) Int. Cl.
| | |
|---|---|
| *G06F 1/26* | (2006.01) |
| *H02M 7/493* | (2007.01) |
| *H02M 5/10* | (2006.01) |
| *H04M 19/08* | (2006.01) |
| *H02M 3/335* | (2006.01) |
| *G05F 1/66* | (2006.01) |

(52) U.S. Cl.
CPC ............ *H04M 19/08* (2013.01); *G06F 1/263* (2013.01); *H02M 3/33569* (2013.01); *H02M 5/10* (2013.01); *H02M 7/493* (2013.01); *G05F 1/66* (2013.01)

(58) Field of Classification Search
CPC ......... G06F 1/263; H02M 5/10; H02M 7/493; H02M 3/33507; H02M 3/33523; H02M 3/33569; G05F 1/66; H04M 19/08
See application file for complete search history.

(56) References Cited

U.S. PATENT DOCUMENTS

| | | | |
|---|---|---|---|
| 6,577,882 B1 * | 6/2003 | Roos ....................... | H04L 12/10 379/279 |
| 7,187,563 B1 * | 3/2007 | Bobrek ............. | H02M 3/33569 363/21.01 |
| 9,319,537 B2 | 4/2016 | Peker et al. | |
| 2016/0309045 A1 * | 10/2016 | Peker .................... | H04M 19/08 |

OTHER PUBLICATIONS

PCT/US2019/044829, International Search Report and Written Opinion of the International Search Authority, dated Jan. 14, 2020.

* cited by examiner

*Primary Examiner* — Elim Ortiz
(74) *Attorney, Agent, or Firm* — Glass and Associates; Molly Sauter; Kenneth Glass (57) ABSTRACT

A reverse power feeding (RPF) power supply unit (PSU) for remote network distribution point unit (DPU) that is reverse powered from multiple customer premise equipments (CPEs). A plurality of power converters, each having a different primary winding and sharing a common secondary winding of a transformer at the PSU, wherein only one of the power converters is operated at a time to provide a desired output voltage.

13 Claims, 5 Drawing Sheets

REVERSE POWER FEED (RPF) POWER SUPPLY UNIT (PSU) AND ASSOCIATED METHOD OF USE

TECHNICAL FIELD

The invention relates generally to the field of reverse power feeding and particularly to a power supply unit that is reverse power fed from customer premises equipment.

BACKGROUND OF THE INVENTION

Various communication standards, including digital subscriber line (xDSL), very-high-bit-rate digital subscriber line 2 (VDSL2), G.hn, and G.fast, have been developed to provide high-speed data transmission from a service provider (e.g., a central office) to a customer premise over existing twisted-pair copper wiring conventionally used for landline telephone service. Additionally, service providers have increased data bandwidth by installing fiber optic cabling between the central office and a distribution point (DPU) located closer to the customer premise. A particular DPU may interface with a bundle of twisted pairs to service a relatively small number of customer premise connections. This approach shortens the length of the copper pair between the CO interface at the DPU and the customer, thereby allowing increased data rates. As such, the DPU provides telephony and/or data to one or more customer premises equipment (CPE).

One difficulty arising from an optical connection between the central office and the DPU lies in the challenge of providing a source of power for the DPU. Since the DPU is positioned at a remote location from the central office, a local power supply for the DPU is often unavailable or expensive to install.

Power for a DPU may be provided by a reverse power feeding (RPF) power supply unit (PSU), wherein power is supplied to the DPU from the PSU by converting power received from the various CPEs for which telephony and/or data services are provided by the DPU. A standard for reverse power feeding is provided by ETSI and the Broadband World Forum. In accordance with the standards, a PSU in the DPU may combine power contributions from multiple CPEs to power a main distribution unit (MDU) that handles the voice and data communications. In this arrangement, the CPEs provide the power to the remote DPUs over the twisted-pair copper wiring by performing power conversion at the PSU of the DPU.

While solutions currently exist that allow the DPU to draw its power from the customer premises equipment using the copper lines, the currently known PSUs for powering the DPU are bulky and expensive. Known PSUs utilize up to 16 independent converters, each power converted associated with a particular CPE, each one requiring its own power transformer, power switch and pulse width modulation (PWM) logic, in addition to a large number of analog components and optocouplers to draw power from the copper lines and to provide fair power sharing between the CPEs, while also insuring full galvanic isolation between the converters.

Accordingly, what is needed in the art is an improved power supply unit (PSU) for a distribution point unit (DPU) implementing reverse power feeding (RPF) which is smaller and more cost effective than the PSUs currently known in the art.

SUMMARY OF THE INVENTION

In accordance with various embodiments of the present invention, an improved reverse power feeding (RPF) power supply unit (PSU) is provided. The PSU may be located in a remote network distribution point unit (DPU) node and is reverse powered by multiple customer premise equipment (CPE) devices.

In one embodiment, the present invention provides a reverse power feed (RPF) power supply unit (PSU) which includes a plurality of power converters. The PSU includes at least one transformer comprising a plurality of primary windings and one secondary winding that is shared by the plurality of power converters. Each of the plurality of power converters of the PSU of the present invention includes, the secondary winding, one of the primary windings of the at least one transformer, a primary controller coupled to the one primary winding, a power port coupled to the one primary winding, the power port to provide an input voltage to be converted to an output voltage at the shared secondary winding and a secondary controller coupled to each of the plurality of power converters, the secondary controller for activating one of the power converters having an input voltage present at its power port when an input voltage is present at the power port of two or more of the plurality of power converters sharing the common secondary winding.

In one embodiment, the PSU of the present invention further includes a delay circuitry and an observer circuitry for preventing more than one of the power converters having an input voltage at its power port from being simultaneously activated.

In another embodiment, the secondary controller comprises steering logic for providing a feedback signal to each of the power converters having an input voltage present at its power port to implement a time division multiplexing (TDM) scheme to activate each of the independent power converters for a substantially equivalent period of time.

In an additional embodiment, the present invention provides a method for operating a reverse power feed (RPF) power supply unit (PSU) which includes, activating only one of a plurality of power converters of the PSU having an input voltage present at its power port when an input voltage is present at a power port of two or more of the plurality of independent power converters, wherein only one of the power converters is activated at a time. In this embodiment, the PSU include at least one transformer having a plurality of primary windings and one secondary winding and each of the plurality of independent power converters of the PSU comprises the one secondary winding, one of the plurality of primary windings coupled to the power port and a primary controller coupled to the primary winding. The method further includes, converting the input voltage at the primary winding of the activated power converter to an output voltage at the shared secondary winding.

Accordingly, the present invention provides and improved power supply unit (PSU) for a distribution point unit (DPU) implementing reverse power feeding (RPF) which is smaller and more cost effective than the PSUs currently known in the art.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description should not be understood as being drawn to scale unless specifically noted.

DETAILED DESCRIPTION OF THE INVENTION

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications, and equivalents, which may be included within the spirit and scope of the various embodiments as defined by the appended claims. Furthermore, in this Detailed Description of the Invention, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

It will be understood that, although the terms first, second, third, etc., may be used herein to describe various elements, components, regions, layers, and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In accordance with various embodiments of the present invention, an improved reverse power feed (RPF) power supply unit (PSU), having a reduced size and a smaller number of required components, is provided. In general, the PSU of the present invention allows a number of independent converters to share a common magnetic core. Due to the limited size of the magnetic core, precautions are preferably implemented to guarantee that not more than one of the independent converters is operational at the same time. Additionally, if more than one of the independent converters has an input voltage present at its power port, the power between the active power ports should be equally shared. In a particular embodiment, the PSU of the present invention can be used to power a distribution point unit (DPU) over twisted-pair copper wire.

In accordance with standard RPF requirements, the reverse power fed PSU is required to service up to 16 input power ports provided by copper twisted pairs. The number of active power ports powering the DPU using the reverse power fed PSU may be any number between 1 and 16. Each power port may have a voltage between 32V and 60V, as a function of the loop length, and all the power lines are galvanically isolated from each other, as well as from the secondary side of the transformer. The secondary side of the converter needs to provide a well-regulated 12V output, up to 20 W. The PSU is required to become active when at least one of the input power ports is connected to a voltage source and when more than one input power port is connected to the PSU, the power from the connected power ports must be substantially equally shared, within a sharing accuracy of +/−3%. The above requirements have been based on the present standards, it being understood that the embodiments herein are not fixed to the present standards, and may be easily adapted by one skilled in the art to future standards which may have different requirements.

Figure 1:
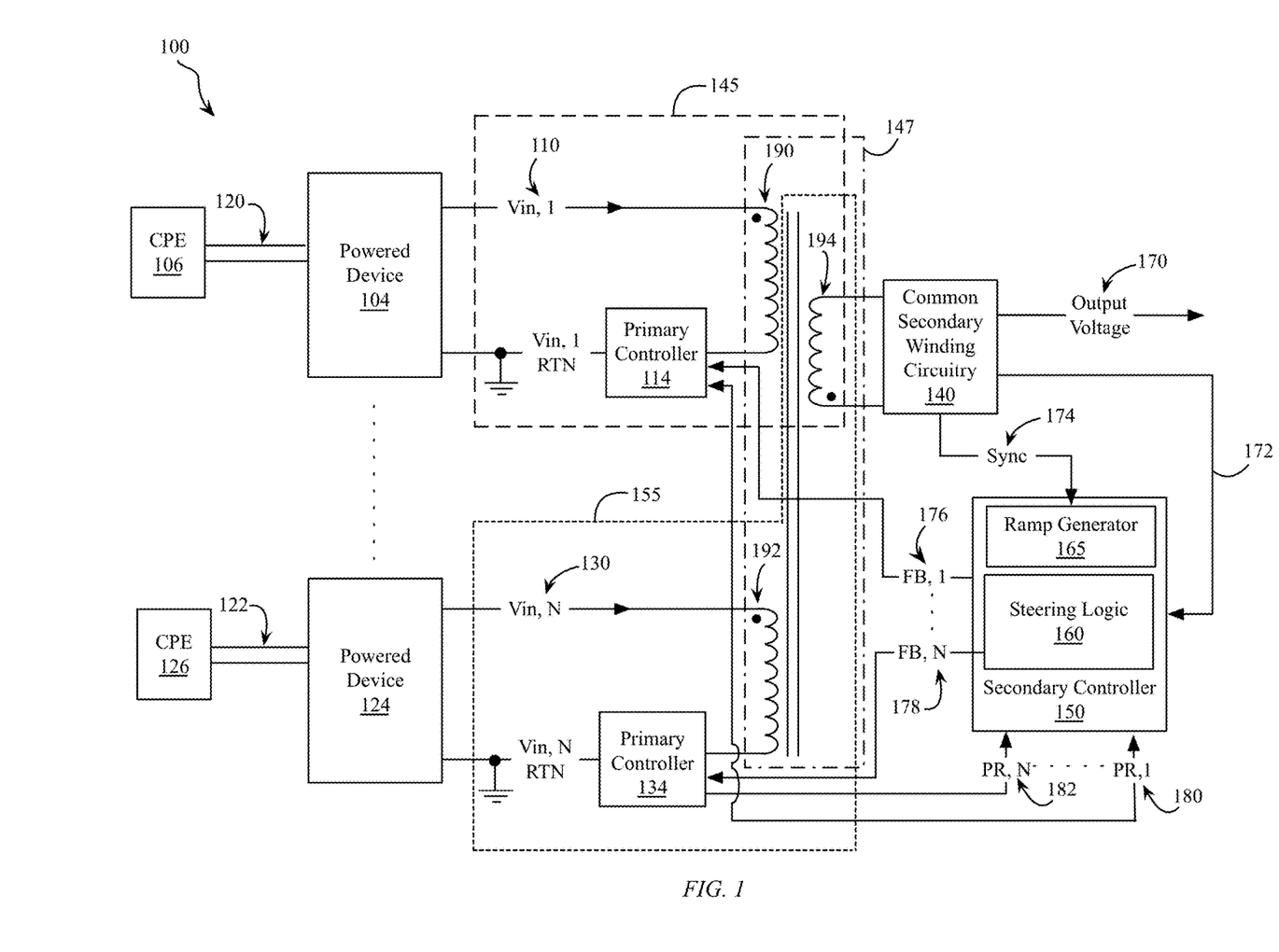
FIG. 1 is a block diagram illustrating a reverse power feeding (RPF) power supply unit (PSU), in accordance with an embodiment of the present invention.

FIG. 1 illustrates a reverse power feeding power supply unit (PSU) 100 in accordance with an embodiment of the present invention. The PSU 100 comprises at least one transformer 147 and a plurality of power converters for converting a voltage received over twisted pair wiring to a desired output voltage. In particular, FIG. 1 illustrates a first power converter 145 and a second power converter 155. However, as shown any number of power converters (1 to N) are within the scope of the present invention. The transformer 147 comprises a plurality of primary windings 190, 192 and a single secondary winding 194. As such, each of the power converters 145, 155 includes one of the primary windings of the transformer 147 and the plurality of power converters 145, 155 share the secondary winding 194 of the transformer 147. In particular, the first power converter 145 includes a first primary winding 190 of the transformer 147 and the second power converter 155 includes a second primary winding 192 of the transformer 147 and both the first power converter 145 and the second power converter 155 share the secondary winding 194 of the transformer 147.

In FIG. 1, the first power converter 145 includes a shared secondary winding 194, first primary winding 190, a primary controller 114 coupled to the first primary winding 190 and an independent power port 110 coupled to the first primary winding 190. In accordance with reverse power feeding (RPF) standards, a powered device 104 receives a voltage over a twisted pair 120 from a customer premise device (CPE) 106. A DC voltage is then established across the first primary winding 190 of the first power converter 145 by the powered device 104 at input port 110, denoted Vin, 1, the potential across input port 110 defined between Vin, 1 and Vin, 1 RTN.

A second power converter 155 includes the shared secondary winding 194, second primary winding 192, a primary controller 134 coupled to the second primary winding 192 and an independent power port 130 coupled to the second primary winding 192. A powered device 124 receives a voltage over a twisted pair 122 from a customer premise device (CPE) 126. A DC voltage is then established across the second primary winding 192 of the second power converter 155 by the powered device 124 at input port 130, denoted Vin, N, the potential across input port 130 defined between Vin, N and Vin, N RTN.

As such, as illustrated in FIG. 1, the secondary winding 194 is shared between the first power converter 145 and the second power converter 155. Additionally, a secondary controller 150 operates to activate a single one of the power converters 145, 155 to transfer power from the primary winding of the one activated power converter to the shared secondary winding 194, thereby converting an input voltage at the respective power port 110, 130 of one of the power converters 145, 155 to an output voltage 170 at the shared secondary winding 194.

As such, in the PSU 100 of the present invention, a number of power converters 145, 155 having primary windings 190, 192 share a common secondary winding 194, wherein the transformer 147 includes the primary windings 190, 192 and the shared secondary winding 194. Additionally, each of the power converters 145, 155 is configured to provide the maximum full power required to maintain the output voltage 170 and since the core is limited in size to the maximum full power required at the output, only a single one of the power converters 145, 155 is operated at one point in time, allowing for a significant reduction in the total magnetic material usage required for the transformer.

While FIG. 1 illustrates only two power converters 145, 155, the PSU 100 of the present invention may include a significantly larger number of power converters to provide reverse power fed power supply unit (PSU). In a particular embodiment, up to 16 power converters may be included to accommodate up to 16 input power ports over the copper twisted pairs following the present RPF standard. As such, the number of active power converters powering the DPU can be any number between 1 and 16. In one exemplary embodiment, the secondary winding 194 may provide a well-regulated 12V (up to 20 W) output voltage 170 from the various input voltages of the power converters 145, 155.

While the number of power converters can be up to a maximum of 16, due to the difficulties in the practical realization of a transformer having a single magnetic core with 16 primary windings and 1 secondary winding, the number of primary windings of the transformer can be limited to 4 or 8 primary windings. Additionally, in many practical applications the equipment itself may be sized for only 4 or 8 input power ports. However, this limitation does not alter the general concept of the invention because one skilled in the art will recognize that the inventive concepts can equally be applied in the case of 2 or 4 transformers.

For example, the PSU 100 may include a transformer having two magnetic cores. To accommodate 16 power converters, in this embodiment, each of the magnetic cores will have eight primary windings and one secondary winding. The respective secondary windings 194 wound on each of the magnetic cores are coupled in parallel with each other to guarantee that only one of the 16 power converters is operating at a single point in time. For example, assuming a first magnetic core and a second magnetic are present in the transformer, when a first power converter of the eight power converters associated with the first magnetic core is operating, an AC voltage will be induced on the secondary winding of the first magnetic core. The same AC voltage will also be present on the secondary winding of the second magnetic core and, by magnetic induction, AC voltages will be induced on the eight primary windings of the second magnetic core, as well as to all the other seven primary windings of the first magnetic core. From a physical perspective, the secondary winding of the second magnetic core will act as a primary winding, while the primary windings of the second magnetic core will act as secondary windings, due to the bidirectional characteristics of the magnetic transformer. As such, the observer circuits of the power converters coupled to the primary windings of the second magnetic core will continue to observe that there is another converter running, although it is running on the first magnetic core. Accordingly, in the case of multiple magnetic cores, the configuration of the present invention guarantees that only one of the power converters is operating at one time by enabling each of power converters to observe that there is another converter running, regardless of the whether or not the converter that is running is on the same magnetic core as the power converter that is observing or on a different magnetic core.

As shown in FIG. 1, the first power converter 145 includes a first primary winding 190 that receives an input voltage at an independent power port 110 to establish a voltage across the first primary winding 190 that is controlled by the respective primary controller 114. The primary controller 114 additionally provides a power present signal 180, denoted PR, 1, to the secondary controller 150 to notify the secondary controller 150 that the first power converter 145 has a voltage present at the independent power port 110. The primary controller 114 additionally receives a feedback signal 176, denoted FB, 1, from the secondary controller 150 to activate the first power converter 145 and to couple electrical energy from the first primary winding 190 to the common secondary winding 194, thereby converting the voltage across the first primary winding 190 to the output voltage 170 at the common secondary winding 194.

Second power converter 155 includes a second primary winding 192 that receives an input voltage at independent input power port 130 to establish a voltage across the second primary winding 192 that is controlled by the primary controller 134. The primary controller 134 additionally provides a power present signal 182, denoted PR, N, to the secondary controller 150 to notify the secondary controller 150 that the second power converter 155 has a voltage present at the input power port 130. The primary controller 134 additionally receives a feedback signal 178, denoted FB, N, from the secondary controller 150 to activate the second power converter 155 and to couple electrical energy from the second primary winding 192 to the common secondary winding 194, thereby converting the voltage across the second primary winding 192 to the output voltage 170 at the common secondary winding 194.

The secondary controller 150 includes steering logic 160 for generating the feedback signals 176, 178 to the power converters 145, 155 and a ramp generator 165 to receive sync signal 174 from a common secondary winding circuitry 140 to synchronize switching of the power converters 145, 155. An output signal 172 is additionally provided to the secondary controller 150 by the common secondary winding circuitry 140 to regulate the output voltage 170, which output signal may be a scaled representation of output voltage 170.

Figure 2:
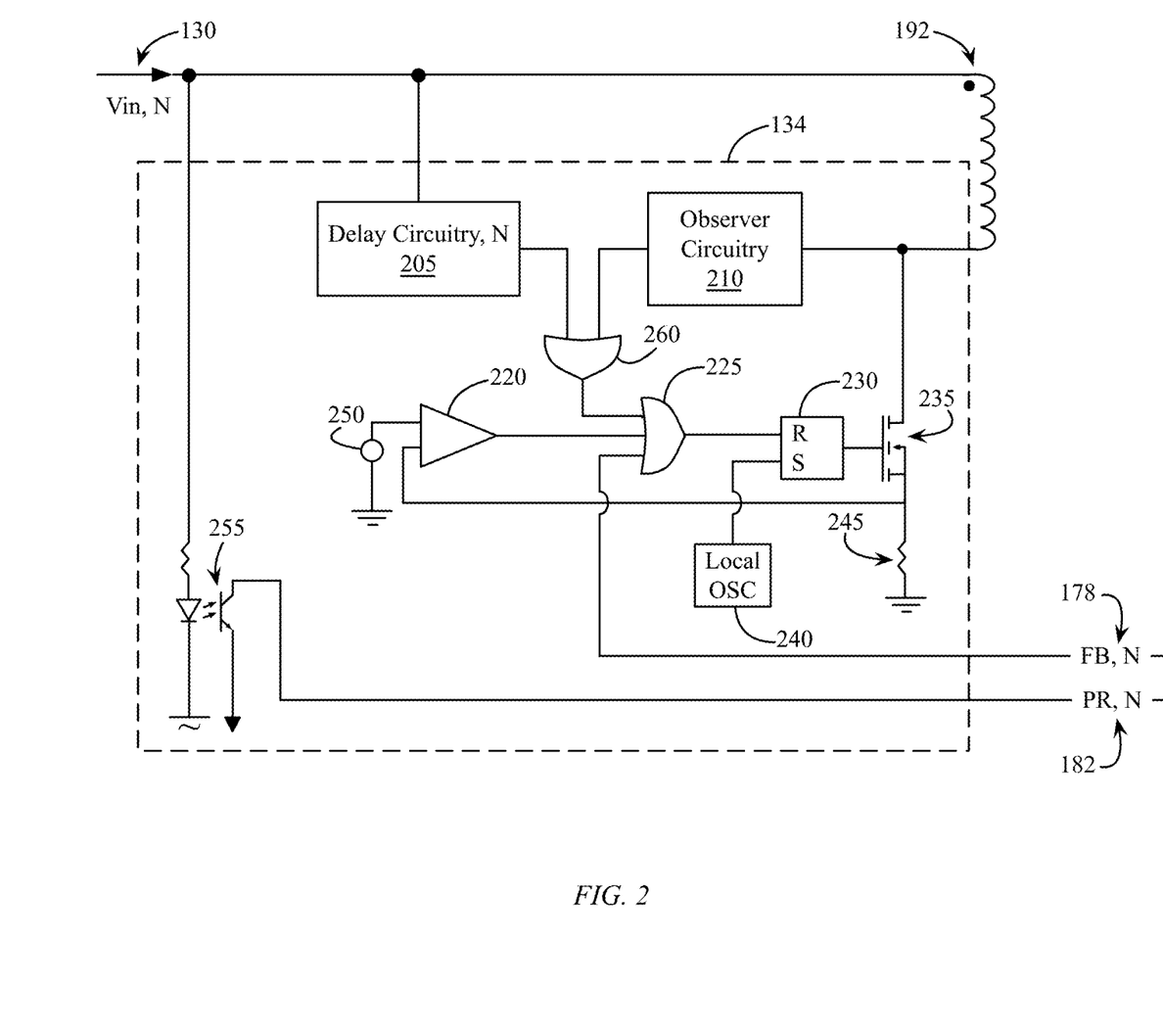
FIG. 2 is a block diagram illustrating a primary controller of the RPF PSU, in accordance with an embodiment of the present invention.

FIG. 2 illustrates an exemplary embodiment of the primary controller 134 of second power converter 155 in more detail, it being understood that the same description may be applied equally to any of the primary controllers. In this exemplary embodiment, the primary controller 134 includes delay circuitry 205 receiving an input from the independent power port 130 and providing an output to a 2-input OR gate 260 and observer circuitry 210 providing inputs to the 2-input OR gate 260, the OR gate 260 having an output coupled to a 3-input OR gate 225. The functions of delay circuitry 205 and observer circuitry 210 will be described further below. The 3-input OR gate 225 further receives a feedback signal 178 from the steering logic 160 of the secondary controller 150 at a second input and an output of a comparator 220 at a third input. The comparator 220 compares a feedback signal from a transistor 235, developed across a resistor 245 coupled from the source of transistor 235 to ground, to a reference voltage 250. A first end of primary winding 192, denoted with a dot, is connected to the respective power port input voltage 130, exhibiting respective input voltage Vin, N, and a second end of primary winding 192 is connected to an input of observer circuitry 210 and to the drain of transistor 235. A local oscillator 240 in combination with a latching circuit 230 results in a fixed switching frequency operation of the second power converter 155. In the illustrated power converter, the maximum peak current through primary winding 192 is defined by the reference voltage 250. The reference voltage 250 combined with the value Rsense of resistor 245, the number of turns on the primary winding 192, the number of turns on the secondary winding 194, in addition to the properties of the magnetic core, define the amount of power transferred from the primary winding 192 to the secondary winding 194, per cycle. The primary controller 134 additionally includes an optocoupler 255 for providing the power present signal 182 to the secondary controller 150 when a voltage is present at the independent power port 130 of the second power converter 155.

In FIG. 2, the second power converter 155 is a flyback converter that operates at a fixed switching frequency. However, this is not intended to be limiting and any other fixed or variable frequency power converter topology is within the scope of the present invention. Additionally, the illustrated second power converter 155 is shown to operate with peak current mode control. In the case of a peak current controlled flyback topology, the peak current is limited to a maximum value and the fixed switching frequency operation automatically allows the power converter to provide a fixed amount of power to the secondary side. The illustrated power converter design takes advantage of the intrinsic characteristics of the flyback topology. However, different embodiments using various converter topologies are within the scope of the present invention.

While the primary controller 134 topology of the second power converter 155 of the power supply unit 100 has been described in detail, the circuitry for all of the primary controllers for each of the power converters of the power supply unit are identical. It follows that the primary controller 114 of the first power converter 145 is identical to the primary controller 134 of the second power converter 155.

Since each of the power converters are sized to provide the maximum amount of power required at the common secondary winding, it follows that the number of primary turns on the primary winding, the sense resistor and the peak reference voltage are equal for all the power converters.

Figure 3:
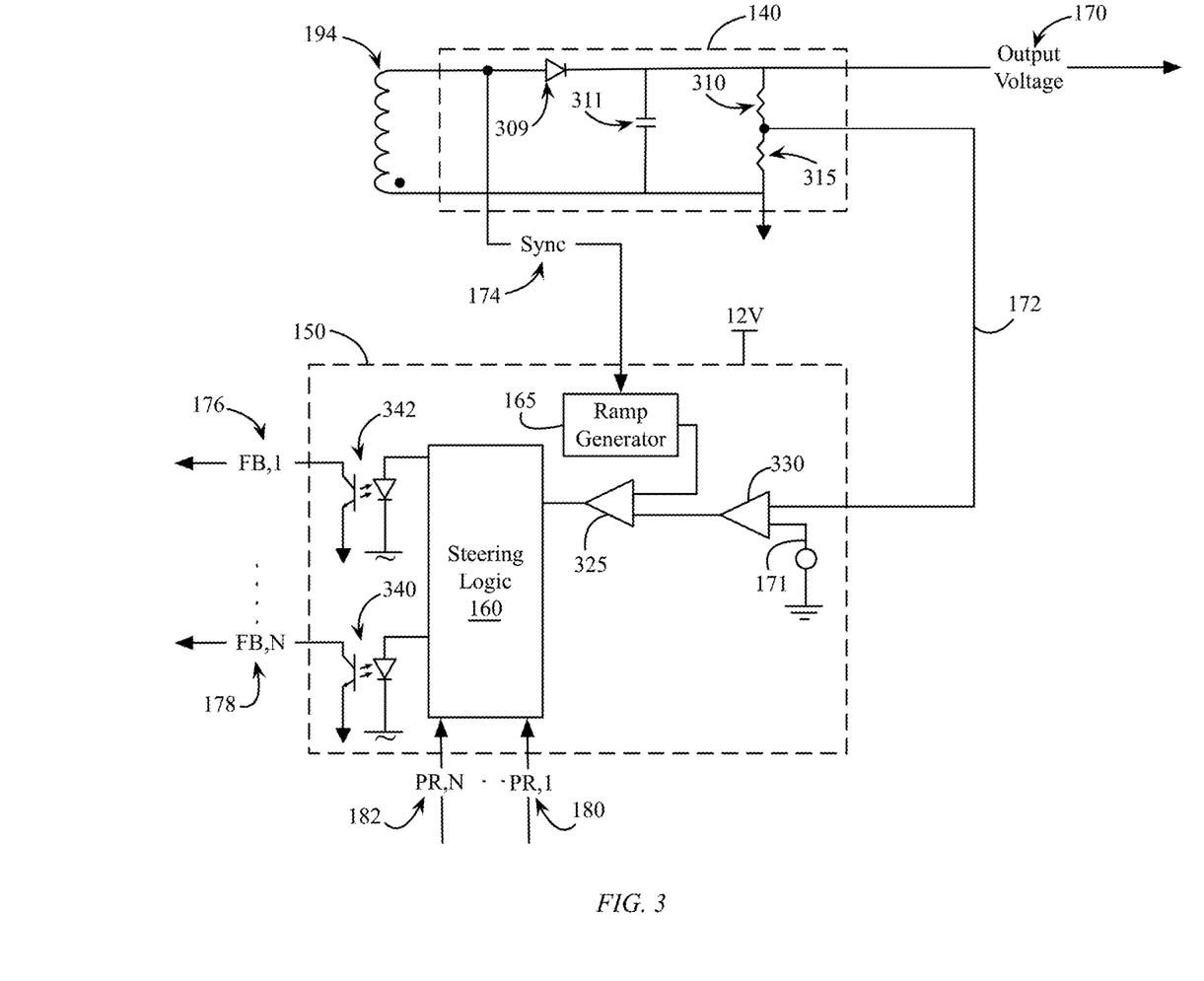
FIG. 3 is a block diagram illustrating a secondary controller of the RPF PSU, in accordance with an embodiment of the present invention.

FIG. 3 illustrates common secondary winding circuitry 140 and the secondary controller 150 in additional detail. As shown, the secondary winding circuitry 140 includes a diode 309, an output capacitor 311 and a feedback resistor divider. The feedback resistor divider includes a first resistor 310 and a second resistor 315, to provide an output signal 172 to a first input of an error amplifier 330 of the secondary controller 150. An output reference voltage 171 provides the second input to the error amplifier 330. The secondary controller 150 further includes ramp generator 165 that receives a sync signal 174 from the common secondary winding circuitry 140 and steering logic 160 that receives power present signals 180, 182 from each of the power converters and provides feedback signals 176, 178 to each of the power converters through respective opto-couplers 340, 342. The ramp generator 165 is synchronized, at every switching cycle, with the power converter that is currently operating using the sync signal 174.

The secondary controller 150 utilizes a time division multiplexing (TDM) scheme to share the power conversion among each of the power converters, where each of the power converters is operated for a fixed % of time and two power converters do not operate at the same time to avoid magnetic core saturation. The TDM scheme is managed by the steering logic 160 of the secondary controller 150.

The steering logic 160 of the secondary controller 150 receives power present logic signals 180, 182, denoted PR, 1, PR, N, respectively, from the optocouplers 255 at each of the power converters 145, 155. The steering logic 160 uses the power present logic signals 180, 182 to determine how many and which input power ports are active at a certain time. The steering logic 160 then enables and transfers the digital feedback signals 176, 178, denoted FB, 1, FB, N, respectively, to the primary converters 145, 155 associated with the active input power ports via the optocouplers 340, 342. As such, feedback signals 176, 178 needed to regulate the output voltage 170 are not transferred in analog form but are advantageously instead transferred as a logic signal via the optocouplers 340, 342. The feedback logic signal performs two functions, it enables the respective primary converter at each switching cycle, wherein if the digital feedback signal 176, 178 is HIGH (inverted logic), the associated independent power converter will remain OFF because the power switch of the independent power converter is kept always OFF responsive to a HIGH input on the Reset input of latch circuit 230 through gate 225. In this embodiment, the latch circuit 230 is a reset dominant latch circuit, and when both the set and reset inputs are low, the reset input will dominate, resulting in the output being low. Additionally, when an independent power converter is activated, the digital feedback signal 176, 178 ends the power switch ON time at every switching cycle, thereby modulating the peak current, hence the energy stored in the magnetic core and the resulting power transferred to the secondary side, thereby regulating the output voltage 170 against variations in the input line voltage and output load.

To properly provide regulation, it is preferable that the ramp generator 165 in the secondary controller 150 be synchronized with the primary converter 145, 155 which is active at any given time. With reference again to FIG. 2, each primary converter 155 has its own local oscillator 240. All of the oscillators in each of the primary converters are preferably arranged to operate at approximately the same frequency, but do not need to be synchronized with each other. Moreover, a range of a few % in the relative frequencies of the oscillators is acceptable. Additionally, the ramp generator 165 in the secondary controller 150 preferably operates at a frequency similar to that of the primary controllers 114, 134, but any variation with respect to the local oscillators is absorbed by the fact that, at every switching cycle, the ramp generator 165 is re-synchronized with the primary converter that is active at any given time. Synchronization is accomplished by means of the voltage on the common secondary winding 194, wherein every time the power switch on the primary winding 192 turns ON, the voltage at the sync signal 174 changes sign (becomes negative). Once the ramp output by ramp generator 165 and the primary controller are synchronized, comparator 325 compares the error voltage output from the error amplifier 330 with the synchronized ramp output from the ramp generator 165 and the output 178 of the comparator 325 is steered to transistor 235 of the primary controller 134 via the optocoupler 340, as feedback signal 178 FB, N to the OR gate 225 and the latch 230 to modulate the transistor 235 ON time, which was initiated by the local oscillator 240, thus defining the transistor duty cycle of that switching period and allowing regulation of the energy transferred by the primary to the secondary winding which, in turn, provides the regulation of the output voltage 170.

The steering logic 160 is effective in activating each of the primary converters 145, 155 of the PSU 100 for a specified period of time, according to the TDM scheme previously described. The steering logic 160 checks how many input ports are present at any given time and, assuming that a number "M" of input ports are present, the steering logic 160 activates the relevant power converters in sequence for a time which is equal to a predetermined total time/M. The predetermined total time is arbitrary, as long as it is much higher than the switching period. As such, the accuracy of the power sharing between different input ports is only a function of a timing accuracy, which may be very high and is dependent only upon the resolution of a timer (not shown) included in the steering logic 160.

Figure 4A:
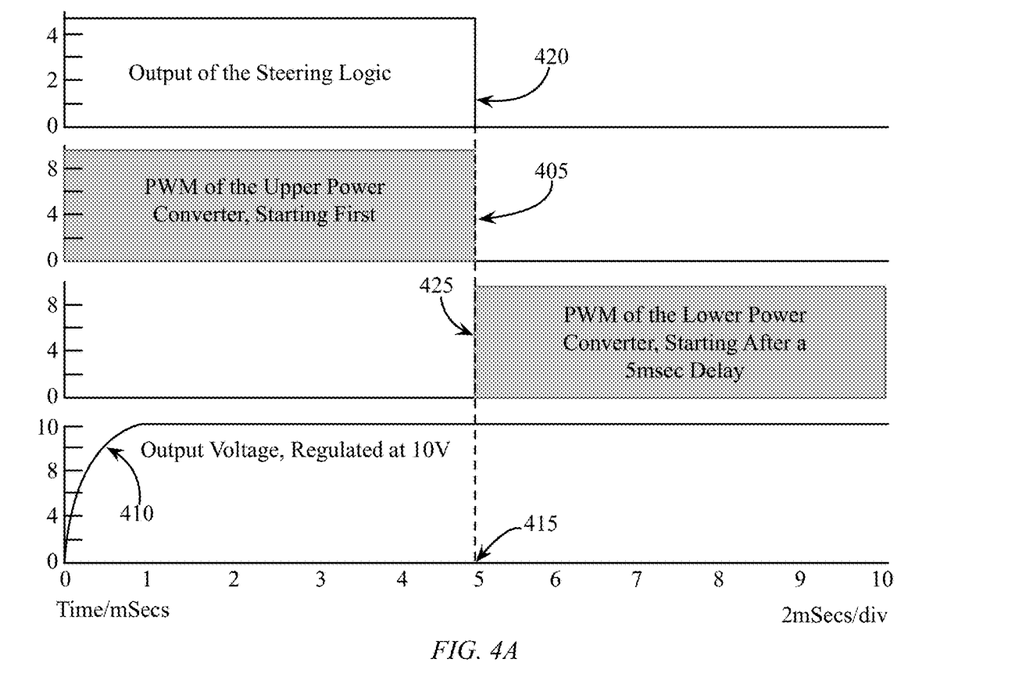
FIG. 4A is a diagram illustrating a time division multiplexing (TDM) scheme for the delay circuitry of the power converters, in accordance with an embodiment of the present invention.

FIG. 4A provides an exemplary illustration of the TDM scheme that is managed by the steering logic 160 of the secondary controller 150. In this exemplary embodiment, two power converters are being sequenced, however this is not intended to be limiting and any number of power converters could be sequenced using the TDM scheme. In this exemplary illustration, the upper power converter is first turned-ON 405 and has an input power port providing 36V. The output voltage 410 is increasing from 0V to the regulated 10V. After 5 msec, at 415, the upper converter 405 is turned-OFF by the steering logic 160, here represented by a simple pulse voltage 420, while the lower power converter, whose input power port provides 60 V, is turned-ON 425. Provided that the switch between the two power converters is fast (i.e. occurring in a few switching cycles), there is no significant drop of the output voltage 410, which is sustained by output capacitors.

As long as the secondary controller 150 is supplied by some voltage, the secondary controller can control the activation of the power converters. However, when the PSU 100 is activated for the first time, the secondary controller 150 is not supplied by a voltage and therefore cannot provide any useful signal. Under this condition, any number of input power ports may be connected at the same time and in an unknown sequence. The obvious risk is that, if more than one power port becomes active before the secondary controller 150 is powered-up, the relevant power converters will activate simultaneously, thereby saturating the transformer's core. This undesirable condition is resolved by means of observing the voltage across each of the primary windings 192, 194.

Referring again to FIG. 2, the observer circuitry 210 of the primary controller 134 keeps the primary converter 155 in reset, i.e. by asserting a signal to the Reset input of latch circuit 230 via gates 260, 225, as long as a switching voltage is detected across transistor 235 the voltage across the primary winding 192 is already switching during the fixed delay time provided by delay circuit 205. The combination of these two conditions ensures that each of the power converters senses the presence of any other power converter. In one embodiment, the observer circuitry 210 may include a comparator, or a comparator with a flip-flop circuit. Accordingly, as soon as a first converter receives its input power 130, it remains in a waiting state for the fixed delay time provided by the respective delay circuitry 205 and observes the voltage on its primary winding 192. If the voltage on the primary winding 192 is switching, that indicates that another second converter is currently active, and the power being transferred to secondary winding 194 by the other converter is being reflected to the primary winding 192 and as a result. For example, when the converter 155 wakes-up in response to a voltage present at the independent power port 130, the observer circuitry 210 observes the voltage on the drain of the transistor 235. If the drain voltage is LOW, it means that another transistor, in another converter, is operating and forcing the drain to be LOW in response to the magnetic coupling between the primary windings. However, if the observer circuitry 210 observes a HIGH voltage on the drain of the transistor 235, that does not guarantee that another converter is not operating, it could simply be currently in an OFF state. So, when the drain voltage is HIGH, the observer circuitry 210 waits and observes during the delay time to see if the drain voltage is actually switching from LOW to HIGH and then to LOW again, thereby confirming that there is another converter currently running. Because a condition where more than one, or all, input voltages appear simultaneously on the power converters may occur, it is sufficient to provide the converters with delay times which are different from each other. The fixed delay time is provided by the delay circuitry 205, and each instance of delay circuitry 205 is set to a respective value. Once the secondary controller 150 is active, it will reset the observer circuitry 210 using signal 178 at each of the primary controllers and take control of the operation of the PSU system.

Figure 4B:
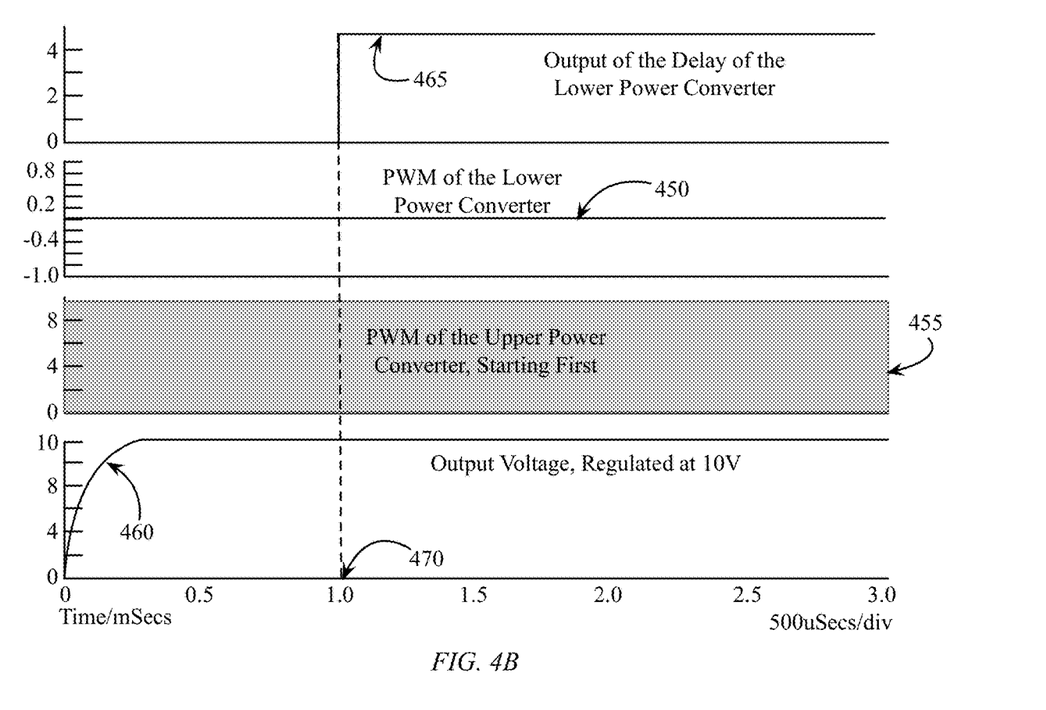
FIG. 4B is a diagram illustrating the behavior of the observer circuitry of the power converters, in accordance with an embodiment of the present invention.

FIG. 4B provides an exemplary illustration of the operation of the observer circuitry 210. In FIG. 4B, an upper power converter and a lower power converter are attempting to start at the same time. In this exemplary embodiment, the upper power converter has an input power port providing 36V and is turned-ON first, providing the PWM signal from the upper power converter 455. In response to the upper power converter turning ON, the output voltage 460 is increasing from 0V to the regulated 10V. In this embodiment, it is assumed that the lower power converter has a relative delay of 1 msec with respect to the upper power converter. The observer circuitry 210 observes the associated primary winding (190, 192) during the 1 msec delay time. As illustrated, because the upper converter is running, the lower converter will stay OFF as shown by the 0V PWM provided by the lower power converter 450, even after the 1 msec delay time 470 has elapsed. The output of the delay of the lower power converter provides the enable signal 465 to the lower power converter after 1 msec, however because the upper power converter in ON when the enable signal 465 is initiated, the lower converter will stay OFF.

Figure 5:
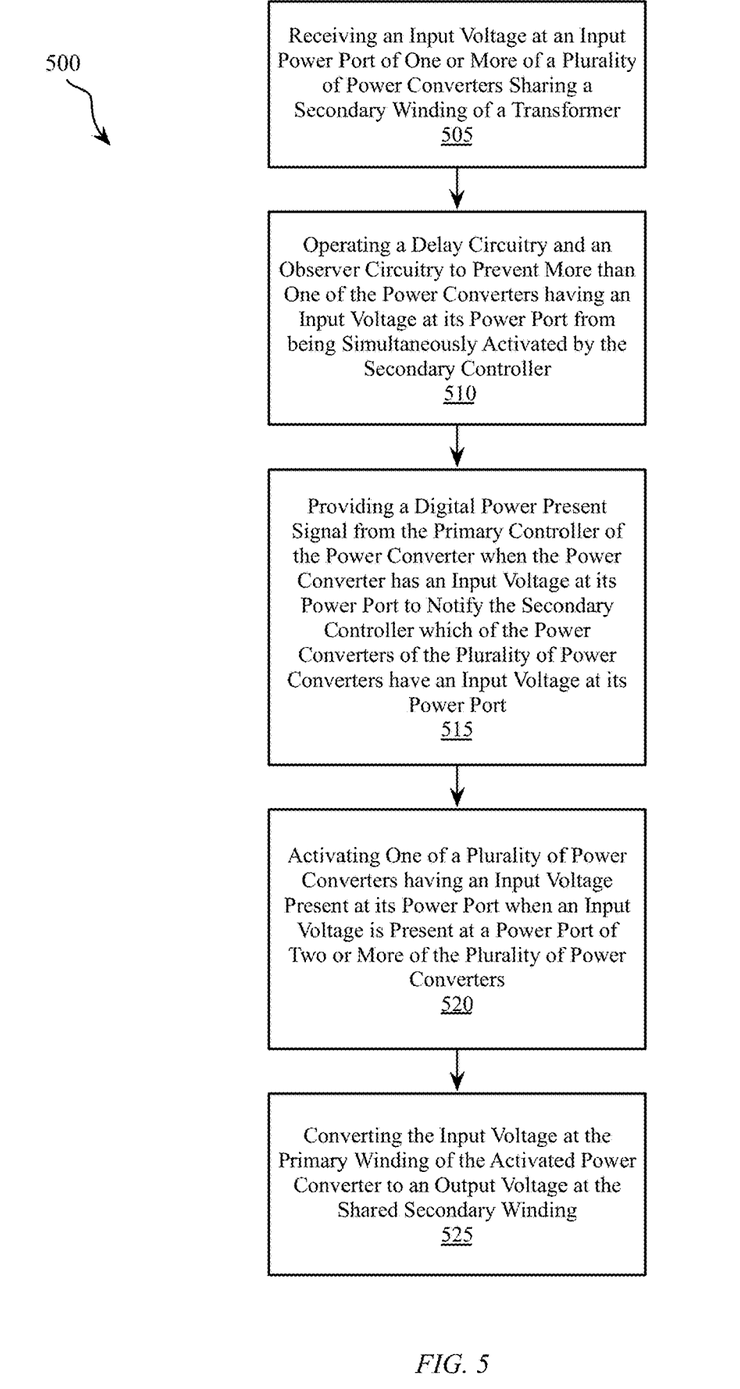
FIG. 5 is a flow diagram illustrating a method operating a reverse power feeding (RPF) power supply unit (PSU), in accordance with an embodiment of the present invention.

With reference to FIG. 5 the operation of the reverse power feeding (RPF) power supply unit (PSU) may begin at a first step 505 by receiving an input voltage at an input power port of one or more of a plurality of power converters. Referring to FIG. 1, an input voltage from a powered device 124 may be received at an independent power port 130 of a power converter 155 of the PSU 100.

A next step 510 may include, operating a delay circuitry and an observer circuitry to prevent more than one of the power converters having an input voltage at its power port from being simultaneously activated by the secondary controller. Referring to FIG. 2, the delay circuitry 205 and the observer circuitry 210 of the power converter 155 are used to prevent more than one of the power converters 145, 155 from being simultaneously activated.

A next step 515 may include, providing a power present signal from each primary controller of the power converter when the power converter has an input voltage at its independent power port to notify the secondary controller which of the power converters of the plurality of power converters have an input voltage at its independent power port. Referring to FIG. 2, a power present signal 182 is provided by an optocoupler 255 of the primary controller 134 of the power converter 155 to the secondary controller 150 when an input voltage is present at its independent power port 130.

A next step 520 may include, activating a single one of a plurality of power converters having an input voltage present at its power port at a time when an input voltage is present at an independent power port of two or more of the plurality of power converters. Referring to FIG. 1, the secondary controller 150 activates one a single one of the plurality of power converters 145, 155 at a time in response to the power present signals 180, 182.

A final step 525 may include, converting the input voltage at the primary winding of the activated power converter to an output voltage at the shared secondary winding. Referring to FIG. 1, the input voltage 130 at the primary winding 192 of the activated power converter 155 is converted to an output voltage 170 at the common secondary winding 194.

In one embodiment, portions of the reverse power feeding (RPF) power supply unit (PSU) may be implemented in an integrated circuit as a single semiconductor die. Alternatively, the integrated circuit may include multiple semiconductor die that are electrically coupled together such as, for example, a multi-chip module that is packaged in a single integrated circuit package.

In various embodiments, portions of the system of the present invention may be implemented in a Field Programmable Gate Array (FPGA) or Application Specific Integrated Circuit (ASIC). As would be appreciated by one skilled in the art, various functions of circuit elements may also be implemented as processing steps in a software program. Such software may be employed in, for example, a digital signal processor, a network processor, a microcontroller or general-purpose computer.

Unless specifically stated otherwise as apparent from the discussion, it is appreciated that throughout the description, discussions utilizing terms such as "receiving", "determining", "generating", "limiting", "sending", "counting", "classifying", or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention may be embodied on various computing platforms that perform actions responsive to software-based instructions. The following provides an antecedent basis for the information technology that may be utilized to enable the invention.

The method of the present invention may be stored on a computer readable medium which may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object-oriented programming language such as Java, C#, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Further, for purposes of discussing and understanding the embodiments of the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

What we claim is:

1. A reverse power feed (RPF) power supply unit (PSU), the PSU comprising:
    a transformer comprising a plurality of primary windings and a secondary winding;
    a plurality of power converters sharing the secondary winding of the transformer, wherein respective ones of the plurality of power converters comprise:
        a respective primary winding of the plurality of primary windings of the transformer;
        a respective independent power port coupled to the respective primary winding, the respective independent power port to provide a respective input voltage to be converted to a respective output voltage at the secondary winding of the transformer;
        a respective primary controller coupled to the respective primary winding and the respective independent power port, the respective primary controller including a delay circuitry, the respective primary controller to provide a respective power present signal when the respective input voltage is present at the respective independent power port; and
    a secondary controller coupled to the plurality of power converters to receive the respective power present signal from the respective power converters of the plurality of power converters having the respective input voltage present at as respective independent power port, the secondary controller including steering logic to provide a respective feedback signal to the respective power converter of the plurality of power converters having the respective input voltage present at its respective independent power port that is to be activated such that the respective input voltage at the primary winding of the activated power co vertex is converted to the respective output voltage at the secondary winding; and
    when the respective input voltage is present at the independent power port of two or more of the plurality of power converters, the feedback signal is to implement a time division multiplexing (TDM) scheme in which one of the two or more respective power converters having the respective input voltage present at its independent power port is operated to provide power at any particular time, the delay circuitry to provide a delay to the respective feedback signal to prevent more than one of the respective power converters having the respective input voltage at its respective independent power port from being simultaneously activated.

2. The RPF PSU of claim 1, wherein respective ones of the power converters comprise a primary optocoupler coupled to the respective independent power port, the primary optocoupler to provide the respective power present signal to the secondary controller when the respective power converter has the respective input voltage at its respective independent power port.

3. The RPF PSU of claim 1, wherein the TDM scheme activates respective ones of the two or more respective power converters having the respective input voltage present at its respective independent power port for a substantially equivalent period of time.

4. The RPF PSU of claim 1, wherein the respective feedback signal is provided to respective ones of the plurality of power converters by a secondary optocoupler.

5. A reverse power feed (RPF) power supply unit (PSU), the PSU comprising:
    at least one transformer comprising a plurality of primary windings and one secondary winding;
    a plurality of power converters sharing the secondary winding of the at least one transformer, wherein respective ones of the plurality of power converters comprise:
        one respective primary winding of the plurality of primary windings of the at least one transformer;
        a respective primary controller coupled to the one primary winding;
        a respective independent power port coupled to the one primary winding, the respective independent power port to provide a respective input voltage to be converted to an output voltage at the secondary winding of the at least one transformer; and
    a secondary controller coupled to respective ones of the plurality of power converters, wherein the secondary controller includes:
        steering logic for providing a respective feedback signal to respective ones of the plurality of power converters having the respective input voltage present at its respective independent power port, and when an input voltage is present at the respective independent power port of two or more of the plurality of power converters, the respective feedback signal to implement a time division multiplexing (TDM) scheme for activating respective ones of the two or more power converters having the respective input voltage present at its respective independent power port for a substantially equivalent period of time;
        a comparator;
        an error amplifier having an output coupled to a first input of the comparator, wherein the error amplifier receives an input from a common secondary winding circuitry coupled to the secondary winding; and
        a ramp generator having an output coupled to a second input of the comparator, wherein the ramp generator receives a sync signal from the common secondary winding circuitry and wherein an output of the comparator is coupled to the steering logic to synchronize the secondary controller with a local oscillator of the one power converter that is activated.

6. The RPF PSU of claim 5, wherein the input voltage is provided by one or more customer premise equipment (CPE).

7. A method of operating a power supply unit (PSU) comprising:
    providing from a respective power converter of a plurality of power converters a respective power present signal when a respective input voltage is present at a power port of the respective power converter, the PSU including a transformer having a plurality of primary windings and a secondary winding, the plurality of power converters sharing the secondary winding;

receiving the respective power present signal from one or more of the power conveners at a secondary controller;

providing a respective feedback signal from the secondary controller to the respective power converters of the plurality of power converters of the PSU having the respective input voltage present at the independent power port of the respective power converter;

activating, in response to the respective feedback signal, the power converters that received the feedback signal so as to convert the respective input voltage at the primary winding of the activated respective power converters to an output voltage at the secondary winding, wherein, when the respective input voltage is present at the independent power port of two or more of the plurality of power converters, the feedback signal to implement a time division multiplexing (TDM) scheme for the PSU in which only one of the plurality of power converters having the respective input voltage present at its independent power port is operated to provide power at any particular time;

receiving a sync signal at the respective one or more of the plurality of power converters that is activated; and in response to the received sync signal synchronizing the secondary controller with a local oscillator of the one or more of the plurality of power converters that is activated.

8. The method of claim 7, wherein respective ones of the plurality of power converters have a peak current controlled flyback converter topology.

9. The method of claim 7, wherein respective ones of the plurality of power converters provide a maximum power required at the shared secondary winding.

10. The method of claim 7, wherein respective power converters of the two or more power converters having the respective input voltage present at its independent power port comprise a local oscillator.

11. A method of operating a power supply unit (PSU) comprising:

providing from a respective power converter of a plurality of power converters a respective power present signal when a respective input voltage is present at a power port of the respective power convener, the PSU including a transformer having a plurality of primary windings and a secondary winding, the plurality of power converters sharing the secondary winding, receiving the respective power present signal from one or more of the power converters at a secondary controller;

providing a respective feedback signal from the secondary controller to respective ones of the power converters of the plurality of power converters of the PSU having the input voltage present at the power port of the respective power converter, providing a delay to the feedback signal;

activating, in response to the delayed feedback signal, the respective ones of the plurality of power converters that received the feedback signal so as to convert the respective input voltage at the primary winding of the activated ones of the power converters to an output voltage at the secondary winding;

when the respective input voltage is present at the power port of two or more of the plurality of power converters, the respective feedback signals to implement a time division multiplexing (TDM) scheme for the PSU in which only one of the plurality of power converters having the respective input voltage present at its power port is operated to provide power at any particular time, receiving a sync signal at the respective ones of the plurality of power converters that are activated; and in response to the receive sync signal synchronizing the secondary controller with a respective local oscillator of the respective ones of the plurality of power converters that are activated.

12. The method of claim 7, wherein the TDM scheme activates respective ones of the two or more power converters having the respective input voltage present at its power port for a substantially equivalent period of time using the feedback signal.

13. The method of claim 7, wherein the respective input voltage is provided by one or more customer premise equipment (CPE).

* * * * *

UNITED STATES PATENT AND TRADEMARK OFFICE
CERTIFICATE OF CORRECTION

PATENT NO. : 11,659,099 B2  
APPLICATION NO. : 16/446498  
DATED : May 23, 2023  
INVENTOR(S) : Renato Colombo and Cesare Bocchiola Page 1 of 1

It is certified that error appears in the above-identified patent and that said Letters Patent is hereby corrected as shown below:

In the Claims

In Claim 1, Column 13, Line 46, "at as" should read --at its--.

In Claim 1, Column 13, Line 53, "co vertex" should read --converter--.

In Claim 7, Column 15, Line 6, "conveners" should read --converters--.

In Claim 11, Column 16, Line 4, "convener" should read --converter--.

In Claim 11, Column 16, Line 31, "receive sync" should read --received sync--.

Signed and Sealed this  
First Day of August, 2023

Katherine Kelly Vidal  
*Director of the United States Patent and Trademark Office*